Patented Mar. 11, 1941

2,234,200

UNITED STATES PATENT OFFICE

2,234,200

ETHERIFICATION PROCESS

Sol Soltzberg, Tamaqua, Pa., assignor to Atlas Powder Company, Wilmington, Del., a corporation of Delaware No Drawing. Application August 11, 1938, Serial No. 224,272

11 Claims. (Cl. 260—615)

This invention relates to a process of etherifying an organic compound which has at least one free hydroxyl group, and more particularly to a process of further etherifying a partially etherified aliphatic polyhydroxylic compound.

In the production of ethers of aliphatic polyhydroxylic compounds, it has heretofore been common to employ various methods of replacing one or more of the hydroxyl hydrogens of the polyhydroxylic compound with an alkyl or aralkyl group. However, the prior methods have been subject to numerous objections. In the Purdie and Irvine method, J. Chem. Soc. 83, 1021 (1903) which involves the use of silver oxide and methyl iodide, the reagents are very expensive; the starting materials are very insoluble in the reagents until partially methylated, necessitating the use of solvents, such as water or methyl alcohol, which react with the reagents causing a loss thereof; and silver oxide, being a mild oxidizing agent, introduces oxidation products into the final material. In the Haworth method, J. Chem. Soc. 107, 8 (1915), which utilizes sodium hydroxide and dimethyl sulfate, the reagents are more economical and have little or no degradative action on the substances present, but the methylation is not as vigorous as is desirable. The method of Irvine and Routledge, J. A. C. S. 57, 1411 (1935), is objectionable because considerable loss of the methylating agent occurs due to the reaction of the methylating agent with the liquid ammonia and this loss occurs even when using the more expensive methyl iodide. In addition, it is wholly impossible to use dimethyl sulfate as the methylating agent in this latter method because it decomposes instantly upon contact with the ammonia.

The method of Muskat, J. A. C. S., 56, 693 and 2449 (1934), recognizes the desirability of removing the liquid ammonia prior to the addition of the methylating agent, but his method of removal results in the formation of a viscous, pasty or caked mass which tenaciously retains ammonia, and which must be further treated to place it in condition for methylation. As a consequence, none of the prior methods of etherification of polyhydroxylic substances is capable of bringing about in a simple and economical manner the complete etherification of all of the hydroxyl groups of the polyhydroxylic compound even when repeated a number of times. In many of the prior methods, the process of etherification becomes slower as the etherification proceeds so that after a certain point is reached it becomes extremely difficult or practically impossible to further introduce ether groups. These factors have caused considerable difficulty in the production of highly or completely etherified products.

The principal object of this invention is to provide an improved process for the etherification of polyhydroxylic compounds.

Another object is to provide a process for the further or substantially complete etherification of partially etherified polyhydroxylic compounds.

Another object is to provide a process which may be employed to bring about the further or substantially complete etherification of a partially etherified aliphatic, six carbon atom, straight chain, hexahydric alcohol (hexitol), such as sorbitol, mannitol, dulcitol, iditol, talitol, etc., or a partially etherified anhydro derivative thereof, such as the monoanhydro derivative thereof, as sorbitan, mannitan, dulcitan, iditan, talitan, etc. or the dianhydro derivatives thereof, such as sorbide, mannide, dulcide, idide, talide, etc., or a partially etherified mixture of polyhydroxylic substances containing at least one of the foregoing hexahydric alcohols or anhydro derivatives thereof, such as the mixture found in commercial sorbitol syrup.

Other objects of the invention will more fully hereinafter appear.

The etherification process of this invention will be described with particular reference to methylation. However, it is to be understood that the invention in its broadest aspect contemplates the introduction of other radicals than methyl. Thus, the process is applicable to etherification in general, as for example, etherification with other alkyl groups such as ethyl in ethylation, or with aralkyl groups such as benzyl in benzylation.

While the etherification process of this invention will be described with particular reference to sorbitol syrup, it is to be understood that it is applicable to polyhydroxylic compounds generally, such as sorbitol, mannitol, anhydro derivatives of mannitol and sorbitol, glycerine, glucose, etc.

The invention as described involves further methylation of a partially methylated material. It will be apparent, however, to those skilled in the art that the invention is applicable to the methylation of a partially ethylated or benzylated material, to further or completely etherify the same or to the ethylation or benzylation of a partially methylated material to further or completely etherify the same. In other words, it is adapted to the production of partially or completely etherified products having different ether groups, i. e. mixed ethers.

The invention is described specifically with relation to the further or complete etherification of partially etherified polyhydroxylic substances for the reason that such partially etherified polyhydroxylic substances are soluble in liquid ammonia. The process is applicable to unetherified hydroxylic substances provided they are soluble in liquid ammonia.

Since in the case of unetherified polyhydric substances such as sorbitol or mannitol the polymetallic salts become insoluble in liquid ammonia before complete substitution of all the hydroxyls takes place, thus requiring several repetitions of the liquid ammonia process, the most important applications of the invention will be in further or completely etherifying a partially etherified material.

If the partially etherified material is not available, it may be prepared in accordance with any of the known methods. For example, partial methylation may be accomplished by the method of Haworth, loc. cit., wherein the polyhydroxylic substance is treated at an elevated temperature with potassium or sodium hydroxide and dimethyl sulfate, which method may be repeated one or more times to effect the desired degree of partial methylation of the polyhydroxylic substance.

In accordance with the present invention, the partially methylated product is dissolved in anhydrous liquid ammonia, and metallic sodium, potassium or lithium is added until no more reacts as indicated by the persistence of a blue color in the mixture. This forms a solution in the ammonia of an alkali metal derivative of the partially methylated polyhydroxylic compound, the alkali metal having replaced one or more of the hydroxyl hydrogens of the unetherified hydroxyl groups. An anhydrous inert diluent having a volatility considerably less than liquid ammonia, and which is a solvent for the ether to be formed, such as ethyl ether or benzene, and preferably benzene, is then added to the ammonia solution. This places the mixture in condition for the convenient and ready removal of the ammonia which is accomplished by any suitable method as by passing a dry inert gas through the mixture, followed by slight warming under vacuum to remove the residual ammonia. The removal of the ammonia leaves a solution or suspension of the alkali metal derivative of the partially methylated material in an anhydrous inert diluent.

A methylating agent, such as methyl iodide or dimethyl sulfate is now added to the solution suspension of the alkali metal derivative of the partially methylated polyhydroxylic compound. A reaction takes place involving replacement of the alkali metal of the alkali metal derivative of the partially etherified material, whereby the number of methyl ether groups in the compound is increased, the amount of methylating agent employed being preferably that required to displace the alkali metal from the alkali metal derivative.

As this methylation takes place, the methylated polyhydroxylic material goes into solution in the inert diluent. The methylated material is recovered from this solution in any suitable manner.

It can be seen from the foregoing that upon removal of the ammonia, the alkali metal derivative is left suspended in the diluent which is inert with respect to the methylating agent, the alkali metal derivative, and the ether, and which is a solvent for the ether.

Below is given a non-limiting example of the process of the invention. For completeness, there has been included in the example the method of carrying out the initial etherification.

*Example*

Sorbitol syrup, prepared by the electrolytic reduction of glucose, and from which sorbitol in the form of sorbitol-pyridine crystals had been removed by means of crystallization from anhydrous pyridine, was used as the starting material. This material was first partially methylated as follows:

Sufficient of the stripped syrup to contain 250 grams of solids admixed with sufficient water (100 grams) to bring the total weight of water in the mixture up to about 66-67% solids, was placed in a container equipped with a sealed mechanical stirrer, a reflux condenser, means for introducing dimethyl sulfate through the reflux condenser into the container and another means for introducing potassium hydroxide solution directly into the container. The container was surrounded by a water bath at 70-75° C. 3500 ml. of 42% aqueous potassium hydroxide solution and 1440 ml. of dimethyl sulfate were then simultaneously and slowly introduced into the container while stirring, the dimethyl sulfate being added through the reflux condenser because of its volatility. The temperature of the water bath was then raised to boiling and maintained at this point for 1½ to 2 hours. The reacted mixture was then removed and the excess alkali neutralized with concentrated hydrochloric acid. The potassium sulfate was filtered and washed thoroughly with hot methyl alcohol. The combined filtrate and washings were evaporated to dryness at reduced pressure. The residue was extracted with hot methyl alcohol and the extract was evaporated to dryness under reduced pressure. 330 grams of syrupy crude material containing some alcohol soluble potassium methyl sulfate were obtained. This procedure yielded material showing from 78-82% methylation. This material was then completely methylated as follows:

The viscous syrup obtained as above was dissolved in 1500 ml. of anhydrous liquid ammonia contained in a gallon silvered Dewar vessel equipped with a mercury-sealed mechanical stirrer, means for introducing metallic sodium and means for introducing benzene. Metallic sodium was then carefully added in small portions at first, until no more was used up as indicated by the persistence of a blue color for 15 to 20 minutes. This required 65 grams of sodium. 500 ml. of anhydrous benzene were then added to the mixture and the ammonia was boiled off by passing dry air through glass tubes immersed in the ammonia. When most of the ammonia was gone, the mixture was transferred to another container and the residual ammonia was removed under vacuum with slight warming. Then 401 grams (176 ml.) of methyl iodide was carefully added with shaking. The reaction mixture was then allowed to stand for 1½ hours at 45° C. Then 500 ml. of water was added to take up the sodium iodide and the benzene layer was recovered, dried and concentrated in a vacuum. The residue was a thin liquid. It was again methylated by being subjected to the same treatment in liquid ammonia, this time requiring 15 grams of sodium and 42 grams (18.4 ml.) of methyl iodide. The methylated product as recovered from this second treatment was in the form of a thin mobile liquid weighing 300 grams. It was 99.9% methylated as determined by acetin number of .03 cc. of normal alkali.

A particularly valuable embodiment of the invention resides in the step of removing the solution of etherified material from any unreacted, suspended, alkali metal derivative by any suitable method such as filtration, decantation, etc., and then adding more anhydrous inert diluent and methylating agent to the separated alkali metal derivative. The etherification of the remaining alkali metal derivative is thus readily accomplished.

While the foregoing description gives instructions as to the preferred mode of carrying the invention into practice, it is to be understood that the invention is not to be limited thereto but is to be limited only as set forth in the appended claims.

While the process has been described with reference to methylation employing an alkyl halide such as methyl iodide or an alkyl sulfate such as dimethyl sulfate, as the etherifying agent it will be understood by those skilled in the art that if benzylation is to be effected a suitable benzylating agent such as benzyl chloride will be employed and that if ethylation is desired, a suitable ethylating agent such as ethyl chloride or ethyl iodide will be employed.

In the claims, by "alkali metal" I refer to an alkali metal in the free, uncombined or metallic form, and intend to include metallic sodium, metallic potassium, metallic lithium, etc.

Having described my invention, I claim:

1. In the process of etherifying an organic compound which is soluble in anhydrous liquid ammonia and which has at least one free hydroxyl group, which comprises forming a solution of said compound in anhydrous liquid ammonia, adding an alkali metal to said solution to form an alkali metal derivative of said compound, removing the ammonia from the said solution of the alkali metal derivative, and reacting said alkali metal derivative with an etherifying agent selected from the group consisting of alkyl halides, alkyl sulfates, and aralkyl halides, to form an ether derivative of said organic compound; the improvement which comprises adding an inert diluent to the solution of said alkali metal derivative before removing the ammonia and conducting the etherifying reaction in said diluent after the ammonia has been removed.

2. In the process of etherifying an organic compound which is soluble in anhydrous liquid ammonia and which has at least one free hydroxyl group, which comprises forming a solution of said compound in anhydrous liquid ammonia, adding an alkali metal to said solution to form an alkali metal derivative of said compound, removing the ammonia from the said solution of the alkali metal derivative, and reacting said alkali metal derivative with an etherifying agent selected from the group consisting of alkyl halides, alkyl sulfates, and aralkyl halides, to form an ether derivative of said organic compound; the improvement which comprises adding anhydrous benzene to the solution of said alkali metal derivative before removing the ammonia and conducting the etherifying reaction in said benzene after the ammonia has been removed.

3. In the process of further etherifying a partially etherified polyhydroxylic material which is soluble in anhydrous liquid ammonia and which has at least one free hydroxyl group, which comprises forming a solution of said partially etherified material in anhydrous liquid ammonia, adding an alkali metal to said solution to form an alkali metal derivative of said material, removing the ammonia from the said solution of the alkali metal derivative, and reacting said alkali metal derivative with an etherifying agent selected from the group consisting of alkyl halides, alkyl sulfates, and aralkyl halides, to form an ether derivative which is more highly etherified than said partially etherified polyhydroxylic material; the improvement which comprises adding an inert diluent to the solution of said alkali metal derivative before removing the ammonia and conducting the etherifying reaction in said diluent after the ammonia has been removed.

4. In the process of further etherifying a partially etherified polyhydroxylic material which is soluble in anhydrous liquid ammonia and which has at least one free hydroxyl group, which comprises forming a solution of said partially etherified material in anhydrous liquid ammonia, adding an alkali metal to said solution to form an alkali metal derivative of said material, removing the ammonia from the said solution of the alkali metal derivative, and reacting said alkali metal derivative with an etherifying agent selected from the group consisting of alkyl halides, alkyl sulfates, and aralkyl halides, to form an ether derivative which is more highly etherified than said partially etherified polyhydroxylic material; the improvement which comprises adding anhydrous benzene to the solution of said alkali metal derivative before removing the ammonia and conducting the etherifying reaction in said benzene after the ammonia has been removed.

5. In the process of further etherifying a partially etherified polyhydroxylic material selected from the group consisting of the aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially etherified material in anhydrous liquid ammonia, adding an alkali metal to said solution to form an alkali metal derivative of said material, removing the ammonia from the said solution of the alkali metal derivative, and reacting said alkali metal derivative with an etherifying agent selected from the group consisting of alkyl halides, alkyl sulfates, and aralkyl halides, to form an ether derivative which is more highly etherified than said partially etherified polyhydroxylic material; the improvement which comprises adding an inert diluent to the solution of said alkali metal derivative before removing the ammonia and conducting the etherifying reaction in said diluent after the ammonia has been removed.

6. In the process of further etherifying a partially etherified polyhydroxylic material selected from the group consisting of the aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially etherified material in anhydrous liquid ammonia, adding an alkali metal to said solution to form an alkali metal derivative of said material, removing the ammonia from the said solution of the alkali metal derivative, and reacting said alkali metal derivative with an etherifying agent selected from the group consisting of alkyl halides, alkyl sulfates, and aralkyl halides, to form an ether derivative which is more highly etherified than said partially etherified polyhydroxylic material; the improvement which comprises adding anhydrous benzene to the solution of said alkali metal derivative before removing the ammonia and conducting the etherifying reaction in said benzene after the ammonia has been removed.

7. In the process of further methylating a partially methylated polyhydroxylic material selected from the group consisting of aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially methylated material in anhydrous liquid ammonia, adding an alkali metal to said solution to form an alkali metal derivative of said material, removing the ammonia from said solution of the alkali metal derivative, and reacting the alkali metal derivative with a methylating agent selected from the group consisting of methyl halides, and methyl sulfates, to form a methyl derivative which is more highly methylated than said partially methylated polyhydroxylic material; the improvement which comprises adding anhydrous benzene to the solution of said alkali metal derivative before removing the ammonia and conducting the methylating reaction in said benzene after the ammonia has been removed.

8. In the process of further methylating a partially methylated polyhydroxylic material selected from the group consisting of aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially methylated material in anhydrous liquid ammonia, adding an alkali metal to said solution to form an alkali metal derivative of said material, removing the ammonia from the said solution of the alkali metal derivative, and reacting the alkali metal derivative with dimethyl sulfate to form a methyl derivative which is more highly methylated than said partially methylated polyhydroxylic material; the improvement which comprises adding anhydrous benzene to the solution of said alkali metal derivative before removing the ammonia and conducting the methylating reaction in said benzene after the ammonia has been removed.

9. In the process of substantially completely etherifying a partially etherified polyhydroxylic material selected from the group consisting of the aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially etherified material in anhydrous liquid ammonia, adding an alkali metal to said solution to form an alkali metal derivative of said material, removing the ammonia from the said solution of the alkali metal derivative, reacting the alkali metal derivative with an etherifying agent selected from the group consisting of alkyl halides, alkyl sulfates and aralkyl halides, to form an ether derivative which is more highly etherified than said partially etherified polyhydroxylic compound, and repeating the foregoing process until a material is obtained, the hydroxyl groups of which are at least 99% etherified; the improvement which comprises adding anhydrous benzene to the solution of said alkali metal derivative each time the same is prepared and before removing the ammonia and then conducting the etherifying reaction in said benzene after the ammonia has been removed.

10. In the process of further etherifying a partially etherified polyhydroxylic material selected from the group consisting of aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially etherified material in anhydrous liquid ammonia, adding an alkali metal to said solution to form an alkali metal derivative of said material, removing the ammonia, reacting said alkali metal derivative with an etherifying agent selected from the group consisting of alkyl halides, alkyl sulfates, and aralkyl halides, to form an ether derivative which is more highly etherified than said partially etherified polyhydroxylic material, and separating the said ether derivative from the alkali salt formed; the improvement which comprises adding an inert diluent, which is a solvent for the ether being prepared, to the solution of said alkali metal derivative before removing the ammonia, then conducting the etherifying reaction in said diluent after the ammonia has been removed.

11. In the process of substantially completely etherifying a partially etherified polyhydroxylic material selected from the group consisting of aliphatic, six-carbon atom, straight chain, hexahydric alcohols, the anhydro derivatives of the aliphatic, six-carbon atom, straight chain, hexahydric alcohols, and mixtures of polyhydroxylic compounds containing at least one of the foregoing compounds, which comprises forming a solution of said partially etherified material in anhydrous liquid ammonia, adding an alkali metal to said solution to form an alkali metal derivative of said material, evaporating the ammonia, reacting said alkali metal derivative with an etherifying agent selected from the group consisting of alkyl halides, alkyl sulfates, and aralkyl halides, to form a completely etherified ether derivative, and separating the said completely etherified material from the alkali salt formed; the improvement which comprises adding anhydrous benzene to the solution of said alkali metal derivative before removing the ammonia whereby said alkali metal derivative remains as a suspension in said anhydrous benzene and conducting the etherifying reaction in said benzene after the ammonia has been removed.

SOL SOLTZBERG.